March 12, 1968 S. BAYBICK ETAL 3,373,248

MAGNETIC TAPE TRANSPORT WITH AZIMUTH ADJUSTMENT

Filed April 1, 1964

Inventors:
SOLOMON BAYBICK,
JOHN B. KELLY AND
BY ANTHONY A. SARITI
Carl V. Olson
Attorney

United States Patent Office 3,373,248

Patented Mar. 12, 1968

3,373,248

MAGNETIC TAPE TRANSPORT WITH AZIMUTH ADJUSTMENT

Solomon Baybick, Riverton, John B. Kelly, Haddonfield, and Anthony A. Sariti, Cherry Hill, N.J., assignors to Radio Corporation of America, a corporation of Delaware Filed Apr. 1, 1964, Ser. No. 356,415

5 Claims. (Cl. 179—100.2)

ABSTRACT OF THE DISCLOSURE

A magnetic tape transport includes a read head unit and a write head unit. The units are collectively adjustable in azimuth relative to the direction of tape motion, one unit is adjustable relative to the other. The head units are fixed on respective fixed and movable portions of a one support member, which in turn has its fixed portion affixed to the movable portion of another support member having a fixed portion affixed to the tape transport frame.

Figure 1:
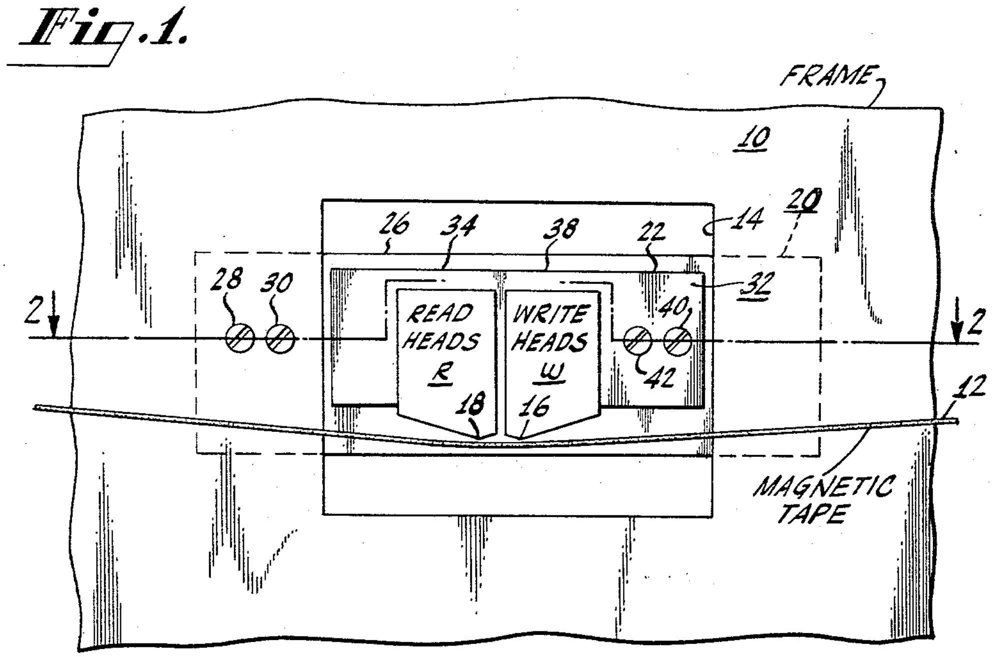

This invention relates to magnetic tape transports used in the magnetic recording and reproducing of information, and particularly to the mounting of reading and writing heads in relation to the path taken by the magnetic tape.

In tape transports for multi-track magnetic tape, a plurality of read heads are arranged along a line extending transversely of the tape, and an equal plurality of write heads are arranged along another parallel line extending transversely of the tape. The read and write heads are usually constructed as a so-called dual head in a single rigid block wherein the relative alignments of the read and write heads are fixed as accurately as possible. Even so, a magnetic tape recorded on the dual head in one tape transport may reveal that the dual head in another tape transport used for reproducing the recorded information has slightly different alignments of the read and write heads. Differences in the fixed relative alignments of read and write heads are particularly troublesome in the case of heads made at different times, or made by different manufacturers. Misalignment of the read heads in the azimuth direction, relative to the recorded information on the several tracks, results in a static skew, in time, of the reproduced signals from the several tracks, which limits the information packing density and speed of operation attainable.

It is therefore a general object of this invention to provide an improved mounting for read and write heads whereby they may conveniently be adjusted in azimuth relative to the tape transport frame and relative to each other.

Figure 2:
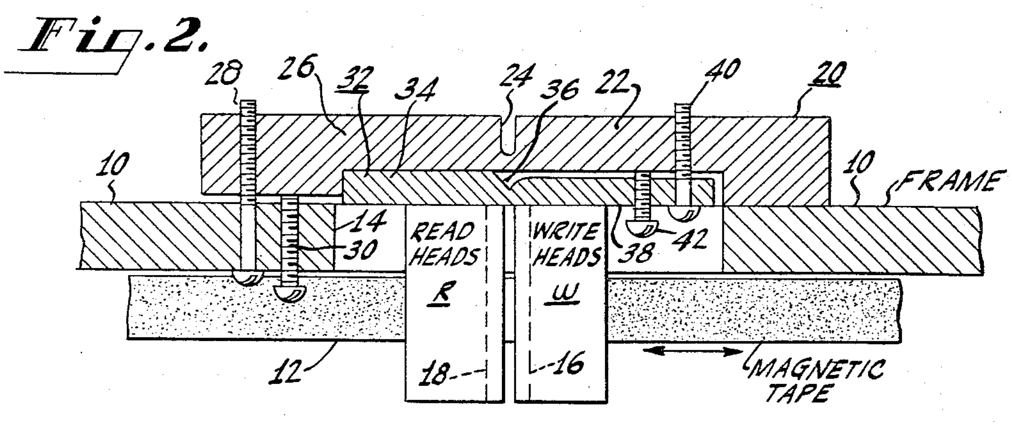

In the drawings:

FIG. 1 is an elevation of the portion of a magnetic tape transport in which magnetic heads are mounted for cooperation with a moving magnetic tape; and FIG. 2 is a sectional view taken on the line 2—2 of FIG. 1.

Referring now in greater detail to the drawing, there is shown a magnetic tape transport frame 10 which serves as a stable reference for the guiding of a magnetic tape 12. The magnetic tape 12 is guided by roller and other anti-friction means (not shown) mounted on the frame 10. The frame 10 is provided with an opening 14 for the mounting therein of adjustably positioned read heads R and write heads W.

The write heads W consists of a rigid block of magnetic heads having their airgaps positioned along a line 16 extending transverse to the longitudinal direction of the magnetic tape 12 and located side by side across the width of the magnetic tape to define tracks for the recording of a plurality of information signals. The read heads R similarly consist of a plurality of magnetic heads having their airgaps arranged along the line 18. It is important that the effective line 16 of the write heads be precisely parallel with the effective line 18 of the read heads. It is also important that the effective lines 16 and 18 of the write and read heads be precisely transverse to the longitudinal direction of the magnetic tape 12.

The block of write heads W and the physical separated block of read heads R are adjustably mounted with reference to the frame 10, and thus with reference to the magnetic tape 12, by means including a first mounting member 20 having a fixed portion 22, having an intermediate notch 24 and having a movable portion 26. The fixed portion 22 of the member 20 is mounted in fixed permanent relation on the frame 10. The movable portion 26 of the member 20 is mounted in adjustable relation to the frame 10 by means of a "pull" screw 28 and a "push" screw 30. The screws 28 and 30 constitute an adjustable coupling between the movable portion 26 of the member 20 and the frame 10.

A second mounting member 32 includes a fixed portion 34, a notch 36 and a movable portion 38. The fixed portion 34 of the second mounting member 32 is permanently affixed to the movable portion 26 of the first mounting member 20. The movable portion 38 of the second mounting member 32 is adjustably coupled through a "pull" screw 40 and a "push" screw 42 to the fixed portion 22 of the first mounting member 20. Since the fixed portion 22 of the first mounting member 20 is fixed in relation to the frame 10, the movable portion 38 of the second mounting member 32 may be viewed as adjustably coupled to the frame 10 through the fixed portion 22 of the first mounting member 20. If desired, the geometries of the elements shown may be modified so that the screws 40 and 42 provide an adjustable coupling directly between the movable portion 38 of the second member and the frame 10.

The block of read heads R is rigidly affixed to the fixed portion 34 of the second mounting member 32. The block of write heads W is rigidly affixed to the movable portion 38 of the second mounting member 32. The read heads R and write heads W are spaced apart just enough to permit an adjustment in their relative positions in the azimuth direction. The first and second mounting members 20 and 32 are most conveniently constructed, as shown, of two pieces of material joined together. However, they can be made of one unitary piece of material, if desired. The mounting members are preferably made of a nonmagnetic material having thickness dimensions such that they are dimensionally rigid at all places except where they are weakened by the notches 24 and 36.

In the operation of the illustrated means for adjustably positioning the head and write heads, all of the screws are initially loosened so that the first and second supporting members 20, 32 are straight and unstressed. The read and write heads then have a relative alignment determined by the fixed mounting surfaces of the several connected elements.

The "pull" screw 28 and the "push" screw 30 are then adjusted concurrently and in opposite directions to cause the movable portion 26 of the mounting member 20, the second mounting member 32 and both blocks of heads R and W to be angularly moved about the notch 24 to align both of the heads R and W to a position transverse to the magnetic tape 12. Then, the "pull" screw 40 and "push" screw 42 are rotated concurrently and in opposite directions to move the movable portion 38 of the second member 32 and solely the write heads W angularly about the notch 36. This adjustment varies the alignment of the write heads W in relation to the read heads R. The operator may then go back and forth in adjusting the two sets of screws until the desired alignment of the two blocks of heads is achieved. The achievement of a desired alignment of the heads may be indicated by the electrical output of the tape station when a tape containing a recording made on another tape station, or a tape containing a calibrated recording, is run through the tape transport.

The head adjusting means described permits adjustment of the read and write heads on a tape transport in the field, so that the effectiveness or speed of operation of the tape station is not limited by an imperfect alignment of heads irrevocably fixed during manufacture. The adjusting means also permits adjustment of the machine so that it can respond correctly to magnetic tapes prepared by other tape stations.

What is claimed is:

1. The combination of
a tape transport frame and guide for a magnetic tape,
a first support member having a fixed portion affixed to said frame and having a movable portion adjustably coupled to said frame,
a second support member having a fixed portion affixed to the movable portion of said first member and having a movable portion adjacent to the fixed portion of said first support member,
a first magnetic head unit mounted in fixed relation with the movable portion of said first support member and the fixed portion of said second support member,
a second magnetic head unit mounted in fixed relation with the movable portion of said second support member and in side-by-side relation with said first magnetic head unit, and
means to adjustably fix the alignment of said second magnetic head unit relative to said first magnetic head unit.

2. The combination of
a tape transport frame and guide for a magnetic tape,
a first support member having a fixed portion mounted in fixed relation to said frame and having a movable portion mounted in adjustable relation to said frame,
a second support member having a fixed portion mounted in fixed relation to the movable portion of said first member and having a movable portion mounted in adjustable relation to the frame, and
a block of read heads and a block of write heads, one of said block of heads being mounted in fixed relation to the fixed portion of said second member, and the other of said block of heads being mounted in fixed relation to the movable portion of said second member.

3. The combination of
a tape transport frame and guide for magnetic tape,
a first support member formed to define a fixed portion which is affixed to said frame and a movable portion which is adjustably coupled to said frame, a second support member formed to define a fixed portion which is affixed to the movable portion of said first member and a movable portion which is adjustably coupled to the fixed portion of said first member, and
a block of read heads and a block of write heads, one of said block of heads being affixed to the fixed portion of said second member, and the other of said block of heads being affixed to the movable portion of said second member.

4. The combination of
a tape transport frame and guide for a magnetic tape,
a first support member having an intermediate notch, having a fixed portion on one side of said notch affixed to said frame and having a movable portion on the other side of said notch adjustably coupled to said frame,
a second support member having an intermediate notch, having a fixed portion on one side of said notch affixed to the movable portion of said first member and having a movable portion adjustably coupled to said frame, and
a block of read heads and a block of write heads, one of said block of heads being affixed to the fixed portion of said second member, and the other of said block of heads being affixed to the movable portion of said second member.

5. In a magnetic tape transport, a mounting assembly providing collective and individual azimuth adjustment of reading and writing heads, comprising
a tape transport frame and guide for a magnetic tape,
a first support member having an intermediate notch, having a fixed portion on one side of said notch affixed to said frame and having a movable portion on the other side of said notch adjustably coupled to said frame,
a second support member having an intermediate notch, having a fixed portion on one side of said notch affixed to the movable portion of said first member and having a movable portion adjustably coupled to said frame through the fixed portion of said first member, and
a block of read heads and a block of write heads, one of said block of heads being affixed to the fixed portion of heads being affixed to the movable portion of said second member.

References Cited

UNITED STATES PATENTS

| | | |
|---|---|---|
| 2,560,569 | 7/1951 | Hare. |
| 3,154,372 | 10/1964 | Kolm. |
| 3,310,791 | 3/1967 | Fisher. |

TERRELL W. FEARS, *Primary Examiner.*

BERNARD KONICK, *Examiner.*

J. R. GOUDEAU, *Assistant Examiner.*

UNITED STATES PATENT OFFICE
CERTIFICATE OF CORRECTION

Patent No. 3,373,248 March 12, 1968

Solomon Baybick et al.

It is certified that error appears in the above identified patent and that said Letters Patent are hereby corrected as shown below:

Column 4, line 45, after "of" insert -- said second member and the other of said block of --.

Signed and sealed this 29th day of July 1969.

(SEAL)
Attest:

Edward M. Fletcher, Jr.
Attesting Officer

WILLIAM E. SCHUYLER, JR.
Commissioner of Patents